United States Patent
Benzinger et al.

(10) Patent No.: US 6,470,300 B1
(45) Date of Patent: Oct. 22, 2002

(54) METHOD AND SYSTEM FOR DETECTING AND LOCALIZING SENSOR DEFECTS IN MOTOR VEHICLES

(75) Inventors: Matthias Benzinger, Rutesheim; Friedrich Boettiger, Esslingen; Rachad Mahmoud, Hochdorf; Avshalom Suissa, Renningen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/300,590

(22) Filed: Apr. 28, 1999

(30) Foreign Application Priority Data

Apr. 28, 1998 (DE) .......................................... 198 18 860

(51) Int. Cl.⁷ ............................................. G01R 23/00
(52) U.S. Cl. ..................... 702/190; 702/183; 702/18 J
(58) Field of Search ........................... 702/190, 35, 36,
702/38, 57, 96, 104, 108, 105, 113–118,
124, 126, 127, 141, 142, 145–148, 154,
182–185, 188, 189, 193, 194, 196, 197,
FOR 160, FOR 164, FOR 103, FOR 170–FOR 172,
FOR 123–FOR 125, FOR 104, FOR 156,
FOR 157, FOR 134, FOR 135, FOR 141,
FOR 150, FOR 151, FOR 155; 701/29–31,
34, 35, 58–61, 63, 65, 70, 71, 74, 79, 82–84,
87, 90–95; 703/2, 6–8; 73/116, 117.2, 117.3,
121; 700/29–31; 303/150

(56) References Cited

U.S. PATENT DOCUMENTS

| | | | | |
|---|---|---|---|---|
| 5,711,023 A | * | 1/1998 | Eckert et al. ................. | 701/70 |
| 5,911,127 A | * | 6/1999 | Tulpule ....................... | 702/190 |
| 5,918,951 A | * | 7/1999 | Rudd, III .................... | 303/150 |
| 6,014,598 A | * | 1/2000 | Duyar et al. .................. | 701/34 |
| 6,144,904 A | * | 11/2000 | Tseng ......................... | 701/34 |

FOREIGN PATENT DOCUMENTS

| | | |
|---|---|---|
| DE | 41 00 006 | 7/1992 |
| DE | 42 26 746 | 10/1993 |
| DE | 42 16 301 | 11/1993 |
| DE | 42 26 749 | 2/1994 |
| DE | 43 25 413 | 2/1995 |

OTHER PUBLICATIONS

*Sensors and Actuators* (1995) entitled "Estimation of the credibility of measurements using parametric models" by J. Oksman et al., pp. 537–541 (no month).

*Technisches Messen 61* (1994) entitled "Klassifikation von Zeitreihen mittels fehlersensitiver Filter" by Clemens Guehmann et al., pp. 16–22 (no month) (no translation).

*Technisches Messen 57* (1990) 11 entitled "Neutral networks as signal and pattern classifiers", by D. Barschdorff et al., pp. 437–444 (no month) (no translation).

(List continued on next page.)

*Primary Examiner*—Hal Wachsman
(74) *Attorney, Agent, or Firm*—Crowell & Moring LLP

(57) ABSTRACT

For detecting and localizing sensor defects in motor vehicles, a sensor determines a measuring signal for the description of the dynamic behavior of the motor vehicle. A state value assigned to the measuring signal is computed from a mathematical equivalent model. An estimation error of the state value is determined and a residue is determined from the difference between the measuring signal and a reference quantity which corresponds to the measuring signal and is formed from the state value. For clearly detecting and localizing the sensor defects, a characteristic parameter is formed by multiplying the residue and the estimation error, and an error signal is generated if the characteristic parameter exceeds a limit value.

25 Claims, 2 Drawing Sheets

OTHER PUBLICATIONS

*Institute of Electrical and Electronics Engineers ISBN* entitled A New Approach for Failure Detection in Uncertain Systems by S. Nowakowski et al., pp. 257–258, Dec. 1993.
*Institute of Electrical and Electronics Engineers ISBN* entitled "Non–Linear Observer–Based Fault Detection" by K. Adjallah et al., pp. 1115–1120, Aug. 1994.
*Int. J. Systems SCI* entitled "Robust Estimation and Compensation for Actuator and Sensor Failures in Linear Systems" by Q. Xia et al., pp. 1867–1876, 1994 (no month).
*Proceedings of the 21$^{st}$ IEEE Conference on Decision and Control* entitled "Projection Operations for Failure Detection and Isolation" by G. Xia et al., pp. 708–711, 1982. (no month).
*Proceedings of the 1983 American Control Conferene* entitled "Comparison of Innovations–Based Analytical Reundancy Methods" by A. Madiwale et al., pp. 940–945, (no month).

*Technisches Messen* tm 57 (1990) entitled "Neuronale Netze als Signal–und Musterklassifikatoren" by D. Barschdorff et al., pp. 437–444. (no month) (no translation).
*Technisches Messen* 61 (1994) entitled "Klassifikation von Zeitreihen mittels fehlersensitiver Filter" by Clemens Gühmann et al., pp. 16–22. (no month) (no translation).
*VDI–Z* 116 (1974) Nr. 14 —October entitled "Identifikation und Parameterschätzung dynamischer Prozesse (Teil 1)" by Von Rolf Isermann, pp. 1147–1142. (no month) (no translation).
*VDI–Z* 116 (1974) Nr. 14—December entitled"Identifikation und Parameterschätzung dynamischer Prozesse (Teil 2)" by Von Rolf Isermann, pp. 1378–1381. (no month) (no translation).
*Messen Prüfen Automatisieren* Mar. 1987 entitled "Prozessüberwachung und Fehlerdiagnose an Maschinen" by K.W. Bonfig et al., pp. 134–143. (no translation).

* cited by examiner

METHOD AND SYSTEM FOR DETECTING AND LOCALIZING SENSOR DEFECTS IN MOTOR VEHICLES

BACKGROUND AND SUMMARY OF THE INVENTION

The invention relates to a method and to a system for the detection and localization of defects in the case of sensors in motor vehicles.

From German Patent Document DE 42 26 746 C1, a method is known for determining a driving-situation-dependent steering angle. The purpose of the method is to determine a desired steering angle value with minimal hardware expenditures. The method is based on a vehicle system model which determines a wheel steering angle based on characteristic the values of the yaw velocity and sideslip angle. The deviations of the desired values from the sensed actual values are controlled by means of a state controlling system.

In such so-called "X-by-wire" systems, electronic vehicle components actively intervene in the driving event and the driving dynamics. This control or automatic control is based on the sensed values. Hence, a defective sensor results in an incorrect actual value for the corresponding quantity. This has the result that the control signals generated by the control or automatic control which influence the driving dynamics are generated on the basis of incorrect information, which may cause an undesired reaction of the vehicle and an impairment of vehicle handling.

The invention is based on the problem of clearly detecting and localizing defects in sensors for detecting system quantities which are used for describing the state of the motor vehicle.

According to the invention, this problem is solved by a method and system for detecting and localizing sensor defects in motor vehicles, in which a measuring signal ($y_k$) for the description of the dynamic behavior of the motor vehicle is determined by a sensor; from a mathematical equivalent model, a state value ($x^-_k$) is computed which is assigned to the measuring signal ($y_k$); an estimation error ($e^-_k$) of the state value ($x^-_k$) is determined; a residue ($r_k$) from the difference between the measuring signal ($y_k$) and a reference quantity ($C^*x^-_k$) corresponding to the measuring signal ($y_k$) and formed from the state value ($x^-_k$) is determined; a characteristic parameter ($\epsilon$) is formed from the multiplication of the residue ($r_k$) and the estimation error ($e^-_k$); and an error signal ($E_I$, $E_L$) is generated when the characteristic parameter ($\epsilon$) exceeds a limit value ($s_k$). The system has a computing unit for determining the state values ($x^-_k$) and the residues ($r_k$) describing the state of the motor vehicle, the measuring signals ($y_k$) of the sensors being feedable as input signals to the computing unit, and an evaluation unit connected on the output side of the computing unit, to which evaluation unit the state values ($x^-_k$) and residues ($r_k$) can be fed as input signals and in which characteristic parameters ($\epsilon$) can be generated from the input signals and can be compared with limit values ($s_k$). An error signal ($E_I$, $E_L$) is produced in the evaluation unit if the characteristic parameters ($\epsilon$) exceed the limit values ($s_k$).

The measuring signals, which are received by sensors, flow into a mathematical equivalent model in which state quantities are estimated which describe the dynamic behavior of the vehicle. These calculated state quantities have an estimation error whose quantity is determined and is multiplied by a residue which is formed from the difference between the measuring signal and a reference quantity which corresponds to the measuring signal and is calculated from the state quantities of the mathematical equivalent model. From the multiplication of the estimation error with the residue, a characteristic parameter is generated by which sensor defects can be detected and localized. The residue is amplified by multiplication with the estimation error, whereby problems with an amplitude which is too low and with superimposed system noise and measuring noise are avoided or otherwise compensated.

The characteristic parameter is used for a further analysis in that a defect signal is generated if the characteristic parameter exceeds a limit value. In this case, the deviation of the measuring signal from the calculated reference quantity is unacceptably high so that the characteristic parameter is above the permissible limit value and the sensor defect can clearly be discovered.

Furthermore, the defect site can also be clearly localized. When several sensors are used, a number of measuring signals is generated which corresponds to the number of sensors. Exactly one physically corresponding reference quantity is specifically assigned to the measuring signals. The reference quantity is determined from the mathematical equivalent model. A residue is assigned to each measuring signal, and a characteristic parameter is assigned to each residue so that, from the position of an unacceptably high scalar value of the parameter within the vector of all characteristic parameters, a conclusion can be drawn with respect to the incorrect measuring signal assigned to the parameter and, as a result, with respect to the defective sensor.

The mathematic equivalent model is expediently based on a Kalman filter algorithm, particularly on an expanded Kalman filter which mathematically corresponds to an observer and is capable of processing stochastic disturbances which affect the system. The sensor signals and, optionally, additional system information, are fed to the Kalman filter. From this information, prediction values, estimation filter values and residues are determined which are further processed for defect recognition. Without any physical redundancy, single as well as multiple defects, particularly in the rotational wheel speed and longitudinal acceleration sensor system, can be recognized.

The state value of the equivalent model corresponds to the prediction value of the Kalman filter which transforms by way of the measuring and observation matrix and, for generating the residues, is advantageously subtracted from the measuring signals. In a next step, from the prediction values and the residues, the optimal estimation filter values can be determined. In this case, the residues are transformed by way of an amplification matrix which preferably takes the form of a Kalman gain.

An occurring (present) sensor defect is reflected by an incorrect prediction value which differs from the estimation filter value of the preceding time period. This difference between the optimal estimation filter value and the prediction value is expressed as an estimation error which is used for identifying a defective sensor.

The estimation error is amplified by multiplication with the residues. In the case of multi-dimensional state quantities and measuring quantities, a diagonal matrix with the elements of the residue is generated on the main diagonal from the residues. The characteristic parameter determined in this manner is a typical identification characteristic which can be assigned to a certain sensor and which can be used for comparison with the permissible limit value.

Advantageously, the limit value is adaptively calculated from the weighted average value of the individual residues. Here, the residues are divided by the number of measuring signals. In addition, the individual residues can be weighted. It is thereby achieved that model uncertainties, which are the result of linearizations in the mathematical equivalent model, do not result in faulty alarms.

The rotational wheel speeds of all vehicle wheels and the longitudinal acceleration of the vehicle are preferably determined as measuring signals.

The system for detecting and localizing the sensor defects comprises a computing unit in which the mathematical equivalent model is filed, and an evaluation unit on the output side to which the state values and residues from the computing unit are fed and in which an error signal is generated if the characteristic parameter determined from the state values and the residues exceeds the limit value.

Other objects, advantages and novel features of the present invention will become apparent from the following detailed description of the invention when considered in conjunction with the accompanying drawings.

DETAILED DESCRIPTION OF THE DRAWINGS

Figure 1:
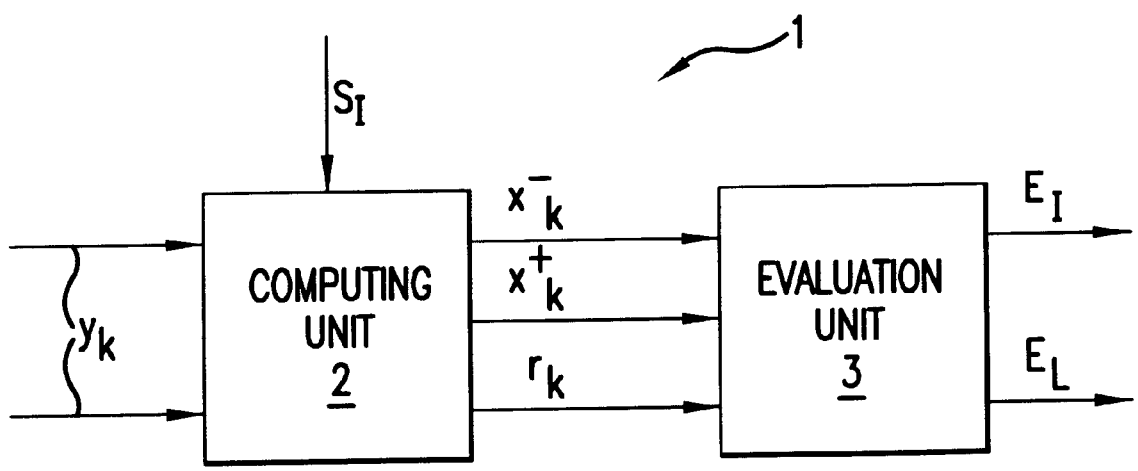
FIG. 1 schematically represents a system for detecting and localizing sensor defects in motor vehicles according to the present invention.

Referring to FIG. 1, the system 1 comprises a computing unit 2 and an evaluation unit 3. It may also contain a vehicle controller for influencing the dynamic vehicle handling. In the computing unit 2, state quantities describing the vehicle system are determined in a mathematical equivalent model. These state quantities are fed to the evaluation unit 3 in which, on the basis of the fed information, a decision is made whether the signal of a sensor fed to the system 1 is faulty.

Figure 2:
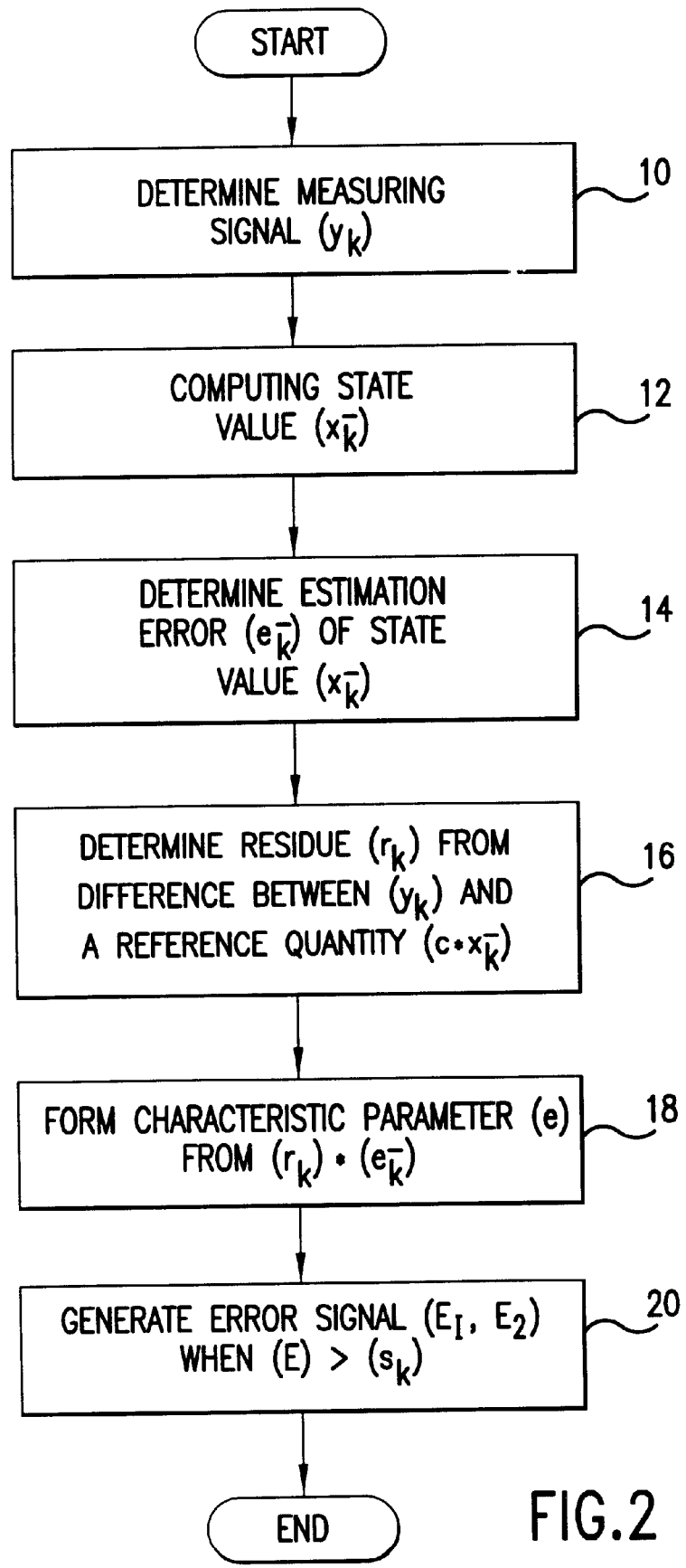
FIG. 2 is a flow chart illustrating the method for detecting and localizing sensor defects in motor vehicles according to the present invention.

Referring also to the flow chart of FIG. 2, by way of sensors, measuring signals $y_k$ (step 10) are fed to the computing unit 2 as time-discrete input signals which represent the vehicle state at various points in time k−1, k, k+1, etc. Furthermore, system information $S_I$ is fed to the computing unit 2 as input signals, particularly masses, moments of inertia, and the like. The system information $S_I$ may be stored in a memory unit which communicates with the computing unit 2 or is integrated in the computing unit 2.

The mathematical equivalent model stored in the computing unit 2 is based on a Kalman filter by which stochastic disturbances affecting the system can be taken into account, and is described by the following vectorial equations:

$$x^-_k = A_{k-1}*x^+_{k-1} + B_k*u_k,\ x^+_k = x^-_k + K_k*r_k,\ r_k = y_k - C_k*x^-_k \quad \text{(step 16)}$$

wherein $x^-_k$ is the prediction value of the Kalman filter representing the state value which is determined directly before the arrival of the measurement at the point in time k; $x^+_{k-1}$ is the optimal estimation filter value of the Kalman filter which is computed immediately after the availability of the measuring signals at the point in time k; and $r_k$ indicates the residues which correspond to the deviation between the measured measuring signal $y_k$ and the computed transformed prediction value $x^-_k$. The matrix A defines the system matrix of the mathematical equivalent model in a time-discrete form, which can be indicated on the basis of movement equations as a function of vehicle-dependent parameters. Matrix B is the time-discrete control matrix by way of which the input vector u is transformed. $C_k$ is the measuring matrix of the system. Matrix $K_k$ is the Kalman gain (amplification matrix) by which the vector of the residues $r_k$ is transformed and which is computed according to the rule:

$$K_k = P^-_k * C^T_k * (C_k * P^-_k * C^T_k + R_k)^{-1}$$

with the prediction covariance matrix $P^-_k$ $$P^-_k = A_{k-1} * P^+_{k-1} * A^t_{k-1} + G_{k-1} * Q_{k-1} * G^T_{k-1}$$

and the estimation filter value covariance matrix $P^+_k$ $$P^+_k = P^-_k - K_k * C_k * P^-_k$$

wherein Q is a covariance matrix of the disturbance vector; G is a disturbance matrix for the distribution of system noises to the state quantities; and $R_k$ is a distribution density matrix. By way of the matrices Q, G and $R_k$, stochastic influences are taken into account.

The prediction value $x^-_k$ determined in the computing unit 2 (step 12), the optimal estimation filter value $x^+_{k-1}$ and the residues $r_k$ are fed as input signals to the evaluation unit 3 which is constructed as a residual evaluation logic. In the evaluation unit 3, an estimation error $e^-_k$ is first computed (step 14) from the difference between the optimal filter estimation value $x^+_{k-1}$ at the preceding point in time k−1 and the prediction value $x^-_k$ at the subsequent point in time k according to the equation $$e^-_k = x^+_{k-1} - x^-_k$$

In a further step, a characteristic parameter $\epsilon$ is determined from the estimation error $e^-_k$ according to the rule $$\epsilon = R^m_k * e^-_k$$

which is a sufficient identification characteristic of a sensor defect. The characteristic parameter $\epsilon$ is used as the basis for the decision whether a measuring signal $y_k$ is outside a permissible frame and therefore the pertaining sensor is defective. For computing the characteristic parameter $\epsilon$, the estimation error $e^-_k$ is multiplied from the left with the diagonal matrix $R^M_k$ which, on the main diagonal, is occupied by the components of the vector of the residues $r_k$. In the case of this computing method, the characteristic parameter $\epsilon$ is present as a vector.

As an alternative, the characteristic parameter $\epsilon$ can also be computed in a scalar manner in that each component of the vector of the estimation values $e^-_k$ is multiplied with the pertaining component of the vector of the residues $r_k$ (steps 16 and 18). This approach has the advantage that the generation of the diagonal matrix $R^M_k$ from the vector of the residues $r_k$ can be eliminated.

As the result of the low-pass filtering of the Kalman filter, the noise parts in the estimation error $e^-_k$ are very low, so that also the signal amplified by the residues—the characteristic parameter $\epsilon$—is low in noise and can be used for the further evaluation.

In the evaluation unit 3, the characteristic parameter $\epsilon$ is compared with a limit value $s_k$ (step 20). If the value of the parameter $\epsilon$ is above the limit value $s_k$, an error signal $E_I$, $E_L$ is generated which advantageously consists of two components and which can be displayed or be fed to control elements in the vehicle. The first component $E_I$ of the error signal indicates that an error was detected. The second component $E_L$ localizes the site of the error signal in that the position of the faulty component within the vector of the characteristic parameter $\epsilon$ is indicated. A direct conclusion can be drawn therefrom with respect to the defective sensor.

The limit value $s_k$ is an adaptive threshold value and is computed from the residue $r_k$ according to the rule $$s_k = 1/m * M_k * r_k$$

wherein m is the dimension of the vector of the measuring signals $y_k$ and $M_k$ is a weighting matrix which is preferably determined empirically and by which individual components of the vector of the residues $r_k$ can be weighted more.

According to a preferred embodiment, the vector of the measuring signals $y_k$ has the dimension m=5 and has the form $$y_k = (\omega_1, \omega_2, \omega_3, \omega_4, a_x)^T$$

with the rotational wheel speeds $\omega_1$, $\omega_2$, $\omega_3$, $\omega_4$ of the vehicle wheels and the longitudinal acceleration $a_x$. These measuring signals are received by way of sensors during the driving operation.

The weighting matrix $M_k$ has the dimension 5×5 and has the form $$M_k = \begin{bmatrix} m_{11} & 0 & m_{13} & 0 & 0 \\ 0 & m_{22} & 0 & m_{24} & 0 \\ m_{31} & 0 & m_{33} & 0 & 0 \\ 0 & m_{42} & 0 & m_{44} & 0 \\ 0 & 0 & 0 & 0 & m_{55} \end{bmatrix}$$

The coefficients $m_{ij}$ of the weighting matrix $M_k$ are determined empirically.

The vector of the prediction values $x^-_k$ has the dimension 10×1 and has the form $$x^-_k = (\omega_1, \omega_2, \omega_3, \omega_4, v_x, \theta, M_1, M_2, M_3, M_4)^T$$

In addition to the true state quantities $\omega_1$, $\omega_2$, $\omega_3$, $\omega_4$ for the rotational wheel speeds and the longitudinal speed $v_x$ which contain intrinsic dynamics, the vector of the prediction values is expanded by five victim states which contribute to an improvement of the model but have no inherent dynamics. These victim states are the inclination of the road $\Theta$ and the wheel torques $M_1$ to $M_4$ affecting the wheels.

In another embodiment, in addition to the road inclination $\Theta$, the slip angles $\alpha_1$, $\alpha_2$, $\alpha_3$, $\alpha_4$ at the vehicle wheels can also be taken into account as victim states.

The vector of the residues $r_k$ has the dimension 5×1:

$$r_k = (r_{1k}, r_{2k}, r_{3k}, r_{4k}, r_{5k})^T$$

From the residues $r_k$, the 5×5 diagonal matrix $R^M_k$ is formed whose main diagonal contains the components of the residue $r_k$ and is otherwise occupied by zero:

$$R^M_k = \begin{bmatrix} r_{1k} & 0 & 0 & 0 & 0 \\ 0 & r_{2k} & 0 & 0 & 0 \\ 0 & 0 & r_{3k} & 0 & 0 \\ 0 & 0 & 0 & r_{4k} & 0 \\ 0 & 0 & 0 & 0 & r_{5k} \end{bmatrix}$$

For forming the characteristic parameter, a matrix—vector multiplication of the diagonal matrix $R^M_k$ takes place with the vector of the estimation errors $e^-_k$, in which case, in the vector of the estimation errors $e^-_k$, only the difference of inherently dynamic state quantities–the rotational wheel speeds and the longitudinal speed–are taken into account but not the components assigned to the victim states.

As an alternative, the diagonal matrix $R^M_k$ can also be formulated corresponding to the dimension of the vector of the prediction values as a 10×10 matrix, which, in contrast to the 5×5 diagonal matrix, is completed by zeros. In this case, the vector—matrix multiplication of the diagonal matrix $R^M_k$ and the vector of the estimation errors $e^-_k$ can take place without a reduction of the dimension of the estimation error vector.

The input vector $u_k$ has the dimension 6×1:

$$u_k = (k_1, k_2, k_3, k_4, a_x, d\psi/dt)^T$$

$k_1$ to $k_4$ are driving and braking torques as well as torques resulting from wheel loads, $d\psi/dt$ is the yaw velocity.

The system matrix A correspondingly has the dimension 10×10; the control matrix B has the dimension 10×6; the measuring matrix $C_k$ has the dimension 5×10; the Kalman gain has the dimension 10×5; the estimation error $e^-_k$ and the characteristic parameter has the dimension 5×1; and the limit value $s_k$ has the dimension 5×1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting and localizing sensor defects in a motor vehicle, the method comprising the acts of:
   determining a measuring signal ($y_k$) for a description of a dynamic behavior of the motor vehicle by a sensor;
   computing from a mathematical equivalent model, a state value ($x^-_k$) which is assigned to the measuring signal ($y_k$);
   computing an estimation error ($e^-_k$) of the state value ($x^-_k$);
   determining a residue ($r_k$) from the difference between the measuring signal ($y_k$) and a reference quantity ($C_k * x^-_k$) corresponding to the measuring signal ($y_k$) and formed from the state value ($x^-_k$);
   forming a characteristic parameter ($\epsilon$) by which sensor defects are detected and localized from the multiplication of the residue ($r_k$) and the estimation error ($e^-_k$); and
   generating an error signal ($E_I$, $E_L$) when the characteristic parameter ($\epsilon$) exceeds a limit value ($s_k$) to indicate that a defect in at least one of the pertaining sensors was detected ($E_I$) and to indicate which one of the pertaining sensors is defective ($E_L$).

2. The method according to claim 1, wherein the mathematical equivalent model is based on a Kalman filter algorithm, the state value being identical to a prediction value and corresponding to the equation $$x^-_k = A_{k-1} * x^+_{k-1} + B_k * u_k$$

wherein
   A is the system matrix,
   B is the control matrix,
   u is the input vector,
   the index "−" is the point in time immediately before the arrival of the measuring signal, the index "+" is the point in time immediately after the availability of the measuring signal, and the index "k" is the time-discrete system representation.

3. The method according to claim 2, wherein the residue ($r_k$) is computed from the measuring signal ($y_k$) and the state value ($x^-_k$) according to the equation $$r_k = y_k - C^* x^-_k$$

wherein

C is the measuring matrix.

4. The method according to claim 2, wherein an optimal filter estimation value ($x^+_k$) is determined from the rule $$x^+_k = x^-_k + K_k^* r_k$$

wherein $K_k$ is the amplification matrix.

5. The method according to claim 1, wherein the residue ($r_k$) is computed from the measuring signal ($y_k$) and the state value ($x^-_k$) according to the equation $$r_k = y_k - C_k^* x^-_k$$

wherein $C_k$ is the measuring matrix.

6. The method according to claim 5, wherein an optimal filter estimation value ($x^+_k$) is determined from the rule $$x^+_k = x^-_k + K_k^* r_k$$

wherein $K_k$ is the amplification matrix.

7. The method according to claim 1, wherein an optimal filter estimation value ($x^+_k$) is determined from the rule $$x^+_k = x^-_k + K_k^* r_k$$

wherein $K_k$ is the amplification matrix.

8. The method according to claim 7, wherein the amplification matrix ($K_k$) is a Kalman gain which is computed according to the equation $$K_k = P^-_k{}^* C_k^{t\,*} (C_k^* P^-_k{}^* C_k^{t} {}^* R_k)^{-1}$$

with a prediction covariance matrix $P^-_k$ $$P^-_k = A_{k-1}{}^* P^+_{k-1}{}^* A^t_{k-1} + G_{k-1}{}^* Q_{k-1}{}^* G^t_{k-1}$$

and a filter estimation value covariance matrix $P^+_k$ $$P^+_k = P^-_k - K_k^* C_k^* P^-_k$$

wherein

Q is a covariance matrix of a disturbance vector,

G is a disturbance matrix for distribution of system noise to the state values, and $R_k$ is a distribution density matrix.

9. The method according to claim 8, wherein the estimation error ($e^-_k$) is determined from the difference between the optimal filter estimation value ($x^+_{k-1}$) and the prediction value ($x^-_k$) according to the equation $$e^-_k = x^+_{k-1} - x^-_k.$$

10. The method according to claim 9, wherein the characteristic parameter ($\epsilon$) is determined from the equation $$\epsilon = R^m_k{}^* e^-_k$$

wherein $R^M_k$ is a diagonal matrix with the components of the residue on the main diagonal.

11. The method according to claim 7, wherein the estimation error ($e^-_k$) is determined from the difference between the optimal filter estimation value ($x^+_{k-1}$) and the prediction value ($x^-_k$) according to the equation $$e^-_k = x^+_{k-1} - x^-_k.$$

12. The method according to claim 11, wherein the characteristic parameter ($\epsilon$) is determined from the equation $$\epsilon = R^m_k{}^* e^-_k$$

wherein $R^M_k$ is a diagonal matrix with the components of the residue on the main diagonal.

13. The method according to claim 1, wherein the limit value ($s_k$) is adaptively calculated from the residue ($r_k$) according to the rule $$s_k = 1/m^* M_k^* r_k$$

wherein for several sensors m is the dimension of a vector of measuring signals ($y_k$) and $M_k$ is a weighting matrix.

14. The method according to claim 1, wherein for several sensors the vector of measuring signals ($y_k$) takes the form $$y_k = (4_1, 4_2, 4_3, 4_4, a_x)^T$$

with the dimension m=5 wherein $\omega_1$ to $\omega_4$ are the rotational wheel speeds of wheels of the vehicle $a_x$ is the longitudinal acceleration of the vehicle.

15. The method according to claim 14, wherein a weighting matrix ($M_k$) has the form $$M_k = \begin{bmatrix} m_{11} & 0 & m_{13} & 0 & 0 \\ 0 & m_{22} & 0 & m_{24} & 0 \\ m_{31} & 0 & m_{33} & 0 & 0 \\ 0 & m_{42} & 0 & m_{44} & 0 \\ 0 & 0 & 0 & 0 & m_{55} \end{bmatrix}$$

wherein the coefficients ($M_{ij}$) of the weighting matrix ($M_k$) are determined empirically.

16. The method according to claim 15, wherein the vector of state values ($x^-_k$) has the form $$x^-_k = (\omega_1, \omega_2, \omega_3, \omega_4, v_x, \theta, M_1, M_2, M_3, M_4)^T$$

wherein $\omega_1$ to $\omega_4$ are rotational wheel speeds of the motor vehicle, $v_x$ is the longitudinal speed of the motor vehicle, $\theta$ is the inclination of a road on which the motor vehicle travels, $M_1$ to $M_4$ are wheel torques acting upon the wheels, and are contained as victim states without inherent dynamics in the state vector.

17. The method according to claim 15, wherein the diagonal matrix ($R^M_k$), which contains the components of the residue ($r_k$) on the main diagonal, has the form $$R_k^M = \begin{bmatrix} r_{1k} & 0 & 0 & 0 & 0 \\ 0 & r_{2k} & 0 & 0 & 0 \\ 0 & 0 & r_{3k} & 0 & 0 \\ 0 & 0 & 0 & r_{4k} & 0 \\ 0 & 0 & 0 & 0 & r_{5k} \end{bmatrix}$$

the estimation error ($e^-_k$) only taking into account the differences of inherently dynamic state quantities.

18. The method according to claim 15, wherein an input vector ($u_k$) has the form $$u_k = (k_1, k_2, k_3, k_4, a_x, d\Psi/dt)^T$$

wherein $k_1$ to $k_4$ are driving and braking torques as well as torques resulting from wheel loads $d\Psi/dt$ is the yaw velocity.

19. The method according to claim 14, wherein the vector of state values ($x^-_k$) has the form $$x^-_k = (\omega_1, \omega_2, \omega_3, \omega_4, v_x, \theta, M_1, M_2, M_3, M_4)^T$$

wherein $\omega_1$ to $\omega_4$ are rotational wheel speeds of the motor vehicle, $v_x$ is the longitudinal speed of the motor vehicle, $\theta$ is the inclination of a road on which the motor vehicle travels, $M_1$ to $M_4$ are wheel torques acting upon wheels of the motor vehicle, and are contained as victim states without inherent dynamics in the state vector.

20. The method according to claim 19, wherein the diagonal matrix ($R^M_k$), which contains the components of the residue ($r_k$) on the main diagonal, has the form $$R_k^M = \begin{bmatrix} r_{1k} & 0 & 0 & 0 & 0 \\ 0 & r_{2k} & 0 & 0 & 0 \\ 0 & 0 & r_{3k} & 0 & 0 \\ 0 & 0 & 0 & r_{4k} & 0 \\ 0 & 0 & 0 & 0 & r_{5k} \end{bmatrix}$$

the estimation error ($e^-_k$) only taking into account the differences of inherently dynamic state quantities.

21. The method according to claim 19, wherein an input vector ($u_k$) has the form $$u_k = (k_1, k_2, k_3, k_4, a_x, d\Psi/dt)^T$$

wherein $k_1$ to $k_4$ are driving and braking torques as well as torques resulting from wheel loads $d\Psi/dt$ is the yaw velocity.

22. The method according to claim 14, wherein the diagonal matrix ($R^M_k$), which contains the components of the residue ($r_k$) on the main diagonal, has the form $$R_k^M = \begin{bmatrix} r_{1k} & 0 & 0 & 0 & 0 \\ 0 & r_{2k} & 0 & 0 & 0 \\ 0 & 0 & r_{3k} & 0 & 0 \\ 0 & 0 & 0 & r_{4k} & 0 \\ 0 & 0 & 0 & 0 & r_{5k} \end{bmatrix}$$

the estimation error ($e^-_k$) only taking into account the differences of inherently dynamic state quantities.

23. The method according to claim 22, wherein an input vector ($u_k$) has the form $$u_k = (k_1, k_2, k_3, k_4, a_x, d\Psi/dt)^T$$

wherein $k_1$ to $k_4$ are driving and braking torques as well as torques resulting from wheel loads $d\Psi/dt$ is the yaw velocity.

24. The method according to claim 14, wherein an input vector ($u_k$) has the form $$u_k = (k_1, k_2, k_3, k_4, a_x, d\Psi/dt)^T$$

wherein $k_1$ to $k_4$ are driving and braking torques as well as torques resulting from wheel loads $d\Psi/dt$ is the yaw velocity.

25. A system for detecting and localizing sensor defects in a motor vehicle, comprising:

sensors which feed measuring signals ($y_k$) describing a dynamic behavior of the motor vehicle as input signals;

a computing unit which receives the measuring signals;

an evaluation unit coupled to an output side of the computing unit;

a computer readable medium for the computing unit and the evaluation unit, said computer readable medium having stored thereon program code segments that:

use a mathematical equivalent model in computing state values ($x^-_k$) assigned to the measuring signals;

compute estimation errors ($e^-_k$) of the state values;

determine residues ($r_k$) from differences between the measuring signals and reference quantities corresponding to the measuring signals and formed from the state values;

form characteristic parameters ($\epsilon$) via multiplication of the residues and the estimation errors; and generate error signals ($E_I$, $E_L$) when the characteristic parameters exceed limit values ($s_k$) to indicate defects in pertaining sensors were detected ($E_I$) and to indicate which of the pertaining sensors were defective ($E_L$).

* * * * *